United States Patent [19]
Puna

[11] 3,720,245
[45] March 13, 1973

[54] TREE HARVESTING VEHICLE

[75] Inventor: Erich Puna, Gavle, Sweden

[73] Assignee: Brundell Och Jonsson AB, Gavle, Sweden

[22] Filed: Nov. 26, 1969

[21] Appl. No.: 880,180

[30] Foreign Application Priority Data

Dec. 16, 1968 Sweden ........................6817202

[52] U.S. Cl. ...............144/3 D, 144/34 R, 214/77 R
[51] Int. Cl. .......................................A01g 23/08
[58] Field of Search ...........214/77, 147 G, 147 AS; 144/3 D, 34 R, 34 E

[56] References Cited

UNITED STATES PATENTS

| | | | |
|---|---|---|---|
| 2,623,602 | 12/1952 | Double | 180/12 |
| 3,102,563 | 9/1963 | Horncastle | 144/3 |
| 3,498,347 | 3/1970 | Vit | 144/3 |
| 3,527,271 | 9/1970 | Chateauneuf | 144/3 |

FOREIGN PATENTS OR APPLICATIONS

| 659,445 | 3/1963 | Canada | 214/77 |
|---|---|---|---|

Primary Examiner—Gerald M. Forlenza
Assistant Examiner—Lawrence J. Oresky
Attorney—Bauer and Goodman

[57] ABSTRACT

An articulated tree harvesting vehicle having a tree cutting and hoisting crane mounted on the front section thereof behind the cab of the vehicle, the crane being horizontally rotable to tree cutting positions, at least forward and rearward of the vehicle, the crane having a first member rotatably mounted behind the cab on the front section for horizontal swinging, a second member pivoted to the first member for movement in a vertical plane about an axis located above the level of the cab roof, a third member pivotally coupled to the second member and a tree cutting and gripping means pivotally coupled to the free end of the third member to provide pivotal movement of the cutting and gripping means in a vertical plane. Further provided is operating means for relatively moving the crane members to cutting positions whereby the cutting means cuts in a substantial horizontal plane below the gripping means, the gripping means maintaining the tree in a substantially vertical direction during the cutting operation and carrying the tree to a loading position in a bunk which is in the rear section behind the motor of the vehicle. The uppermost extremity of the motor is approximately at, or below, the level of the lowermost load engaging portion of the bunk, so that the load carried by the bunk can extend over the motor. At least a major portion of the bunk is within the horizontal diameter of the rear wheel on the rear frame section. Steering and carden shaft means is provided for transmitting motor power to the wheels of the vehicle.

2 Claims, 1 Drawing Figure

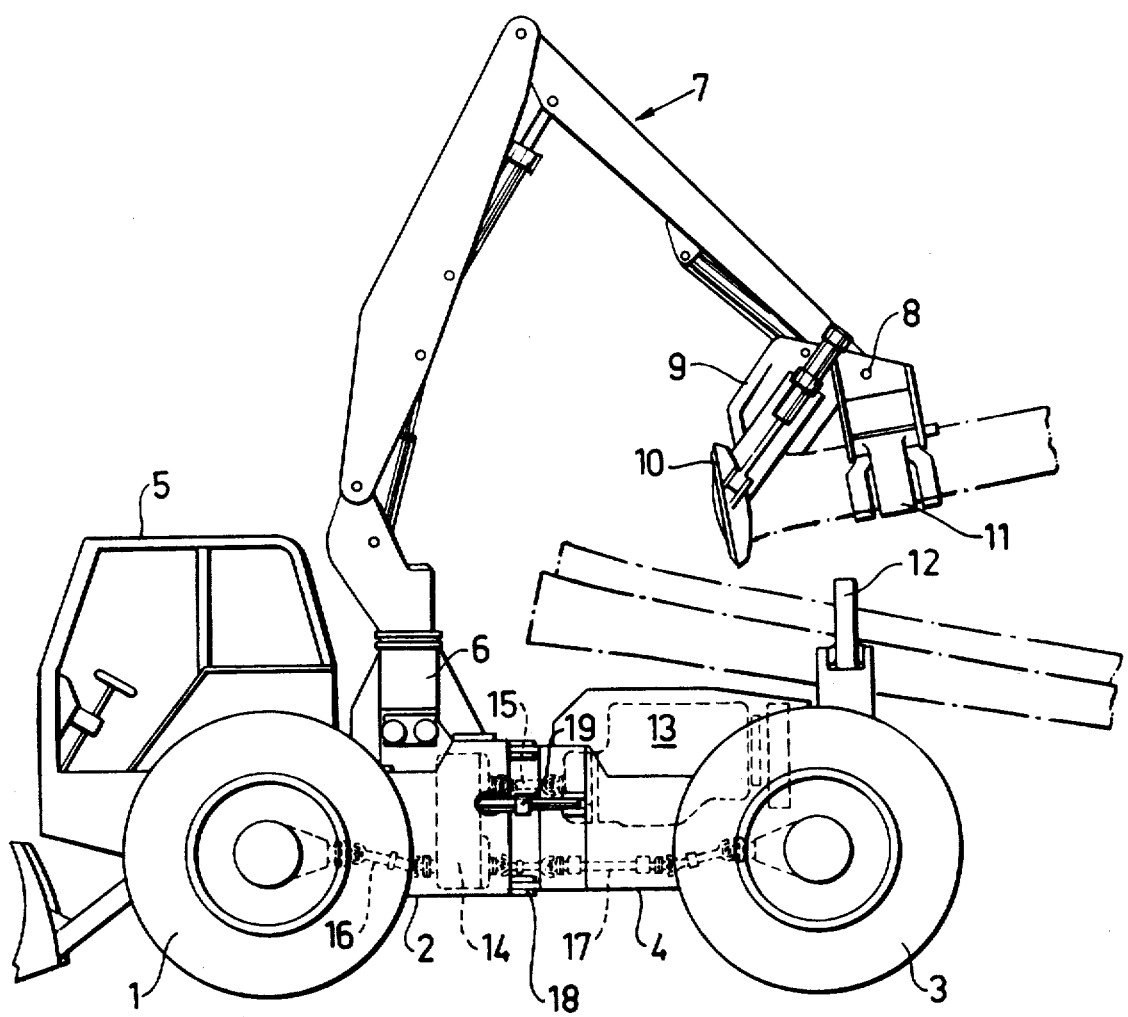

TREE HARVESTING VEHICLE

BACKGROUND OF THE INVENTION

The invention relates to a tree harvesting vehicle primarily intended to transport felled trees from the cutting place but preferably also intended to cut off the trees. The vehicle is of the type in which front and rear frame sections are articulated in relation to each other by means of a vertical axis.

Hitherto harvesting vehicles of this kind have generally been built with the motor located in front of the driver's seat on the front frame section, while a hoisting crane has been placed in front of the load bunk on the rear frame section. However, this design has involved inconveniences. Particularly the motor projecting forwardly has been an obstacle when driving the vehicle in rough terrain, and also the cutting and handling of the trees have been rendered more difficult. On the other hand, the motor located in front of the vehicle has served to counterbalance the weight of the crane and its load.

SUMMARY OF THE INVENTION

The object of the invention is to provide a harvesting vehicle more practical in use. For that purpose, the cab is placed on the front frame section above the front wheel axle, and the hoisting crane is mounted behind the cab on the same frame section. The driving motor is suspended within the rear frame section in front of the rear wheel axle, and the gearbox is mounted in the front frame section below the crane. The motor drives the gearing by means of a cardan shaft, and the gearing drives in turn both wheel axles by cardan shafts. Further, a load bunk is disposed at the back of the rear frame section to make possible a skidding of felled trees and trucks.

Thus, by placing the motor in a space which is usually only utilized to a small extent, it is possible not only to avoid a cumbersome overhang in front of the front wheel axle but also to maintain a short wheel base which facilitates the moving of the vehicle over rough terrain. Also more space is saved on the top sides of the frame sections for control means as well as for trunks to be transported on the load bunk. Since the hoisting crane is mounted on the front frame section, the loading bunk can be disposed immediately behind, above or even slightly before the rear wheel axle without reducing its distance to the base of the crane to such an extent that the loading is rendered more difficult. Because of the resulting free space above the rear frame section, the butt ends of trunks placed on the load bunk may be permitted to extend inwardly as far as half the length of the vehicle so that the load is better distributed. Because of its location immediately behind the driver's seat the crane will, moreover, have a greater working radius in front of the vehicle, and in the absence of a motor hood in front of the cab the driver has a good view so that the cutting can be carried out quite close to the front of the vehicle. Another advantage is that a motor suspended within the rear frame section causes less disturbing noise at the driver's seat.

DETAILED DESCRIPTION OF THE INVENTION

The invention will be described in more detail with reference to the accompanying drawing which shows a side elevation of a tree harvesting vehicle according to a preferred embodiment.

The front wheels of the vehicle support a front frame section 2 which is connected by a vertical pivot 18 to a rear frame section 4 supported by the rear wheels 3. In the known way, the two frame sections 2,4 may be pivoted horizontally in relation to each other by means of an hydraulic steering cylinder 19 with piston. Though not shown, the axle of the front wheels may in the known way be mounted in a cradle adapted to pivot about a horizontal axis perpendicular to said wheel axle. The driver's cab 5 is placed at the extreme forward end of the vehicle above the front wheels 1, and immediately behind it a vertical upright 6 is supported by the front frame section 2. The upright 6 carries a crane 7 mounted to be rotated horizontally. In the embodiment shown, the outer end of the fore crane arm is connected to a bracket 9 by means of a horizontal pivot 8, and said bracket carries a cutting mechanism 10 as well as gripping members 11.

A load bunk 12 adapted to receive a number of trunks is mounted on the rear frame section 4 above the rear wheels. Thus, a tree gripped by the members 11 and cut off by the cutting means 10 may be lifted by the crane 7 which is then rotated horizontally to deposit the tree on the loaded bunk 12. The mechanisms mentioned which are preferably controlled hydraulically, may be of a known construction and need not be described in detail.

The motor 13 of the vehicle is suspended within the rear frame section 4 in front of the rear wheel axle. As appears from the drawing, the top of the motor is preferably on a level slightly below the load bunk 12. By means of a cardan shaft indicated at 15, the motor 13 drives a gearing in a gearbox 14 disposed within the front frame section below the upright 6, and the gearing drives in turn the front and rear wheel axles by cardan shafts 16 and 17, respectively.

The advantages of the vehicle described have already been mentioned above. As apparent from the drawing, there is a free space above the motor so that the butt ends of trunks deposited on the bunk 12 may extend inwardly onto the base of the crane 7. Hereby the load can be more evenly distributed. The cutting operation may, when necessary, be carried out immediately in front of the cab without the obstacle of a motor hood.

What I claim is:

1. A tree harvesting vehicle comprising:
    front and rear frame sections, and articulated means coupling said frame sections together in relation to each other, each frame section being supported by a wheel carriage;
    the load bunk on the rear frame section, at least a major portion thereof being within the horizontal diameter of the rear wheel;
    a cab on the front front section centrally above the axle of the front wheel carriage;
    a tree cutting and hoisting crane mounted on the front frame section behind the cab, said crane being horizontally rotatable to tree cutting positions including tree cutting positions at least forward of said vehicle, and to tree loading positions at the rear of said vehicle, said crane comprising:
    a first member rotatably mounted behind the cab on the front section for horizontal swinging;

a second member pivotally coupled at one end thereof to said first member for movement in a vertical plane and about an axis located above the level of the cab roof;

a third member pivotally coupled at one end to the other end of said second member for movement in a vertical plane;

tree cutting and gripping means pivotally mounted to the lower end of said third member to provide pivotal movement of said cutting and gripping means in a vertical plane; and operating means coupled to said first, second and third members and to said cutting and gripping means for selectively pivoting said first, second and third members and said cutting and gripping means to said cutting and loading positions, such that in said cutting position said cutting means cuts in a substantially horizontal plane below the gripper and said gripping means grips and maintains said tree in a substantially vertical direction, and said operating means pivoting said first, second and third members and said cutting and gripping means to carry said tree to said loading position and to place the cut tree in the bunk and to orient the cut tree in a substantially horizontal plane and substantially endwise of the vehicle with the cut end facing the crane base;

a driving motor suspended within the rear frame section and forward of the rear axle and forward of the bunk, the uppermost extremity of the motor being approximately at, or below, the level of the lowermost load engaging portion of the bunk, whereby the load carried by the bunk may extend over the motor;

a gearing mounted in the front frame section; and carden shaft means for transmitting motive power from the motor to the gearing and from the gearing to each of the wheel axles.

2. The tree harvesting vehicle of claim 1 wherein said load bunk is positioned above the axle of the rear wheel carriage.

* * * * *